Figure 1:
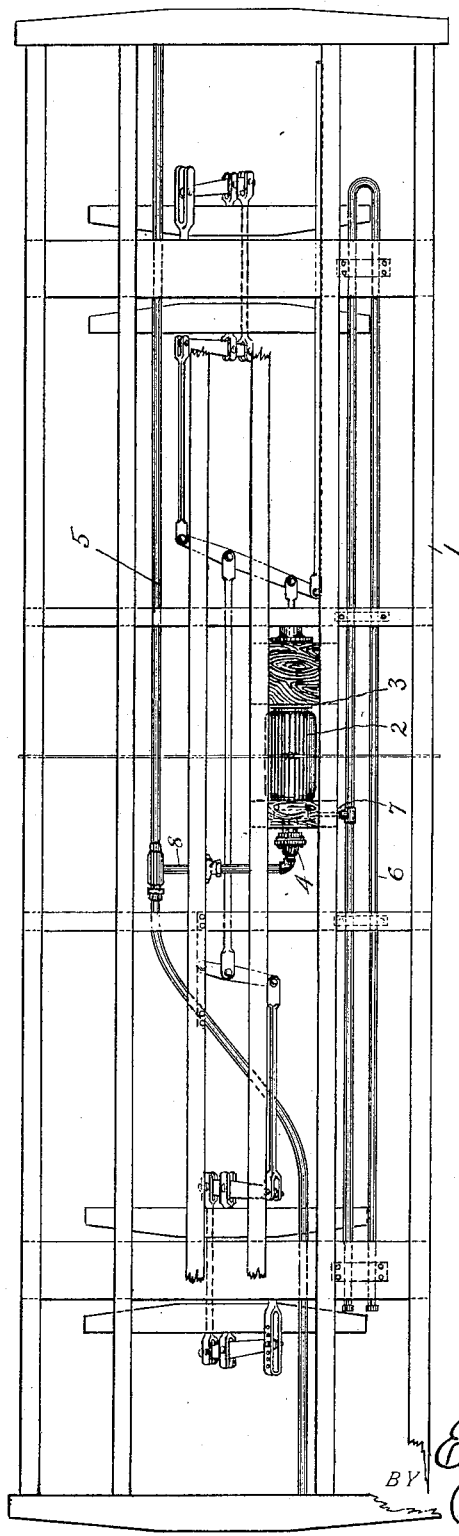

No. 731,234. PATENTED JUNE 16, 1903.
E. G. SHORTT.
AIR BRAKE VALVE MECHANISM.
APPLICATION FILED APR. 16, 1900. RENEWED MAR. 14, 1903.

NO MODEL. 9 SHEETS—SHEET 1.

WITNESSES:
N. S. Shortt.
John Unaw.

INVENTOR.
Edward G. Shortt,
BY Fred E. Tasker,
ATTORNEY.

No. 731,234. PATENTED JUNE 16, 1903.
E. G. SHORTT.
AIR BRAKE VALVE MECHANISM.
APPLICATION FILED APR. 16, 1900. RENEWED MAR. 14, 1903.
NO MODEL. 9 SHEETS—SHEET 4.

WITNESSES:
INVENTOR.
Edward G. Shortt
BY
Fred C. Tasker
ATTORNEY.

No. 731,234. PATENTED JUNE 16, 1903.
E. G. SHORTT.
AIR BRAKE VALVE MECHANISM.
APPLICATION FILED APR. 16, 1900. RENEWED MAR. 14, 1903.
NO MODEL. 9 SHEETS—SHEET 5.

No. 731,234. PATENTED JUNE 16, 1903.
E. G. SHORTT.
AIR BRAKE VALVE MECHANISM.
APPLICATION FILED APR. 16, 1900. RENEWED MAR. 14, 1903.
NO MODEL. 9 SHEETS—SHEET 6.
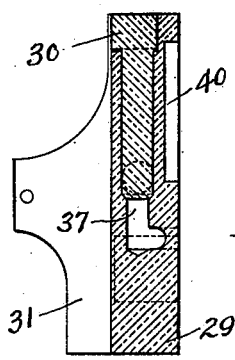
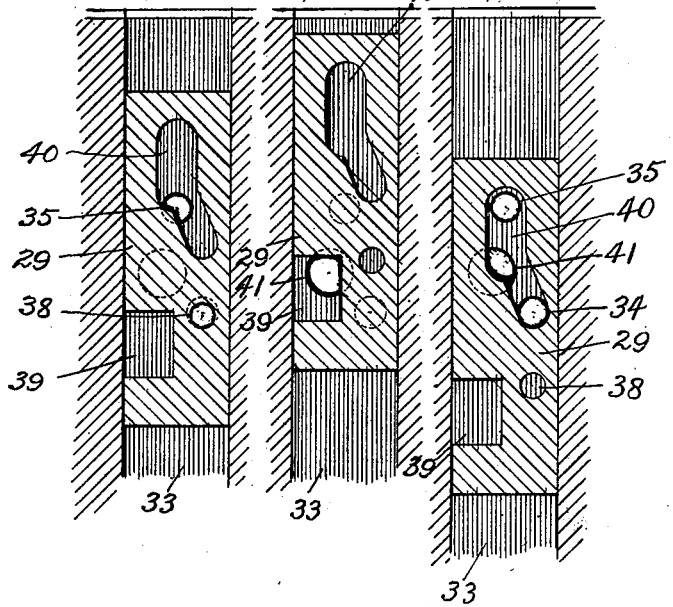

No. 731,234. PATENTED JUNE 16, 1903.
E. G. SHORTT.
AIR BRAKE VALVE MECHANISM.
APPLICATION FILED APR. 16, 1900. RENEWED MAR. 14, 1903.
NO MODEL. 9 SHEETS—SHEET 7.

WITNESSES:
H. G. Shortt
John Unsin.

INVENTOR.
Edward G. Shortt,
BY Fred A. Asker
ATTORNEY.

No. 731,234. PATENTED JUNE 16, 1903.
E. G. SHORTT.
AIR BRAKE VALVE MECHANISM.
APPLICATION FILED APR. 16, 1900. RENEWED MAR. 14, 1903.
NO MODEL. 9 SHEETS—SHEET 8.

WITNESSES:
INVENTOR.
Edward G. Shortt,
BY
ATTORNEY.

No. 731,234. PATENTED JUNE 16, 1903.
E. G. SHORTT.
AIR BRAKE VALVE MECHANISM.
APPLICATION FILED APR. 16, 1900. RENEWED MAR. 14, 1903.
NO MODEL. 9 SHEETS—SHEET 9.

WITNESSES:
INVENTOR.
Edward G. Shortt,
per Fred C. Tasker
ATTORNEY.

No. 731,234. Patented June 16, 1903.

UNITED STATES PATENT OFFICE.

EDWARD G. SHORTT, OF CARTHAGE, NEW YORK, ASSIGNOR TO THE INTERNATIONAL AIR BRAKE COMPANY, OF JERSEY CITY, NEW JERSEY, A CORPORATION OF NEW JERSEY.

AIR-BRAKE VALVE MECHANISM.

SPECIFICATION forming part of Letters Patent No. 731,234, dated June 16, 1903.

Application filed April 16, 1900. Renewed March 14, 1903. Serial No. 147,865. (No model.)

*To all whom it may concern:*

Be it known that I, EDWARD G. SHORTT, a citizen of the United States, residing at Carthage, in the county of Jefferson and State of New York, have invented certain new and useful Improvements in Air-Brake Valve Mechanisms, of which the following is a specification.

My invention relates to certain novel and valuable improvements in valve mechanisms for air-brakes.

I have several objects in view, my principal aim being to improve the valve in various respects.

One important feature is the provision of an air-containing tank, receptacle, or reservoir, which I term the "graduating-reservoir," the same being entirely independent of and distinct from the auxiliary reservoir and intended to furnish all the pressure required for graduation purposes or service applications.

Another feature is the complete reservation of the auxiliary-reservoir supply for use in emergency applications only, its store of air being kept intact and never drawn upon except in emergent cases.

Still another feature is the conjoint utilization in emergency applications of this reserved auxiliary-reservoir supply and as much of the train-pipe air as may be needed, an automatic regulation of the train-pipe air-supply being accomplished through suitable means, so that when the pressure in the brake-cylinder is below the train-pipe pressure enough of the latter may be supplied to bring about equalization, and then the balance of the train-pipe air that has been admitted to the triple valve can be discharged into the atmosphere.

Another important feature is the saving of a certain amount of the braking fluid at the time of release after emergency application and returning the same to the graduation-reservoir to be reused. In the operation of the valve it is also to be noted that at emergency the graduating-reservoir pressure is applied to open a primary emergency-valve for supplying train-pipe air to the brake-cylinder.

Numerous other important features will be patent from the ensuing description of the construction and operation, and it will be made apparent that from the improved construction essential advantages are obtained, prominent among which is that of being able to release without an excess of pressure and with a small train-pipe pressure.

The invention therefore may be said to consist, essentially, in the construction, arrangement, and combination of parts and in numerous details and peculiarities thereof, substantially as will be hereinafter described and claimed.

Figure 2:
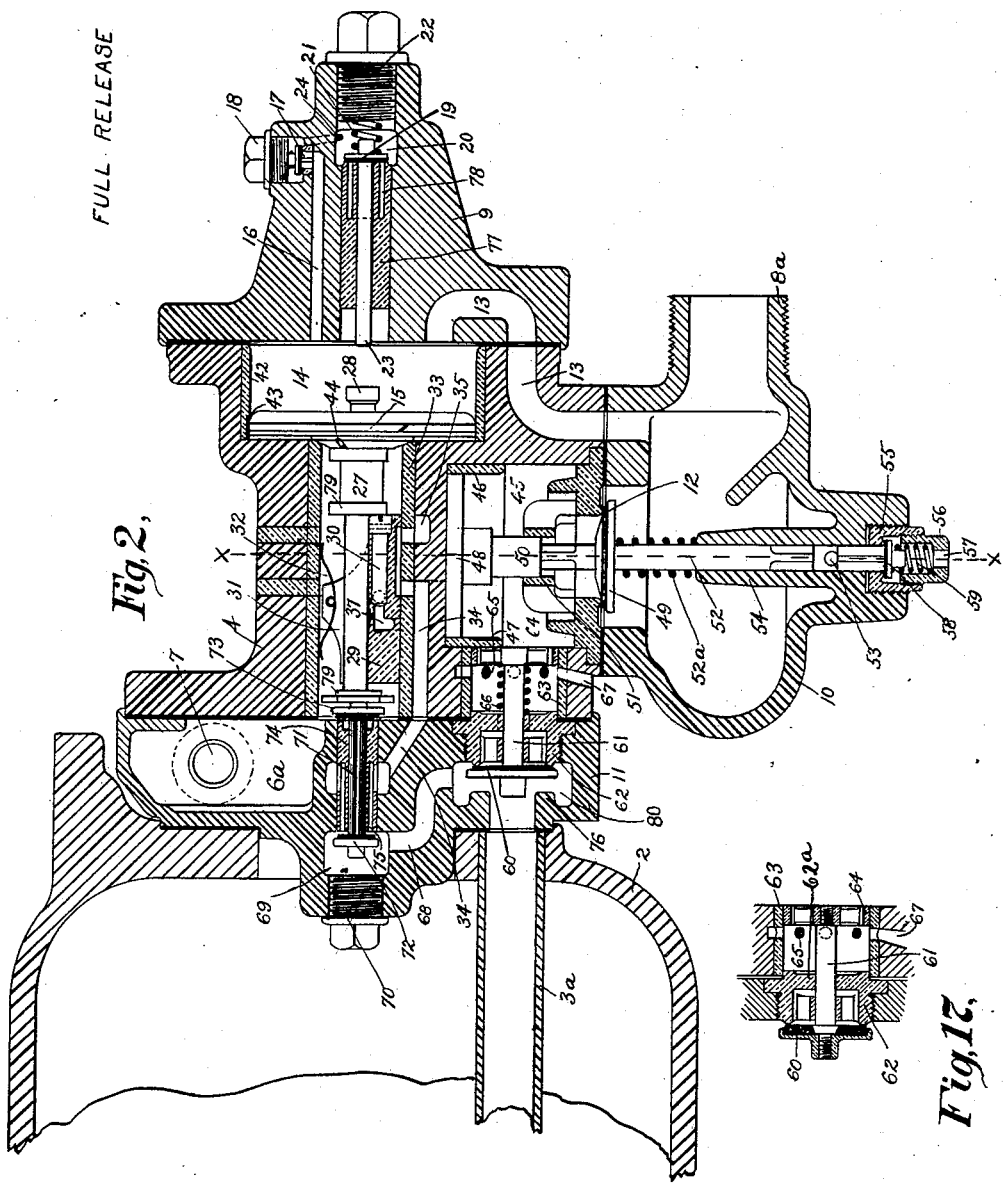
Figure 3:
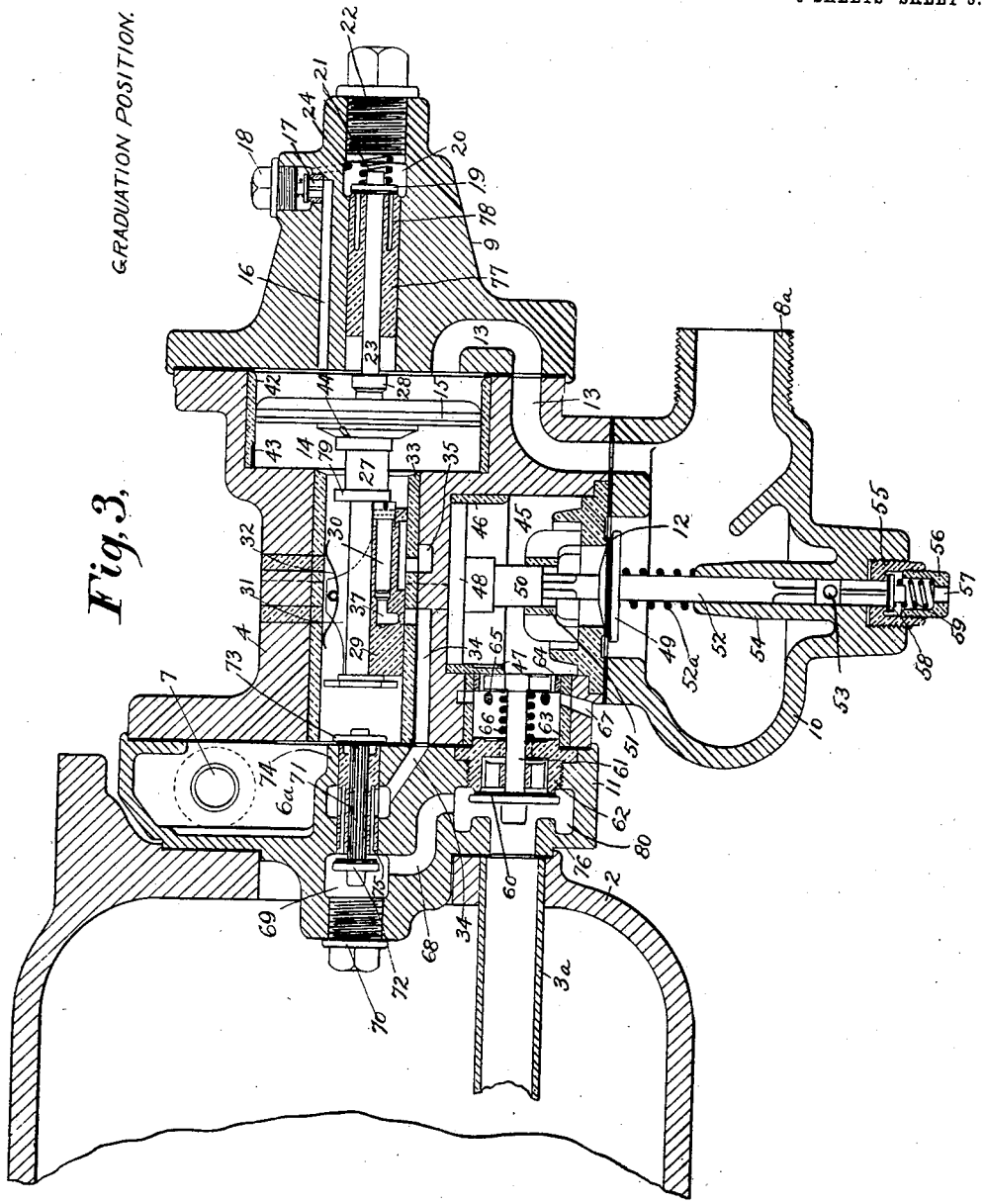
Figure 4:
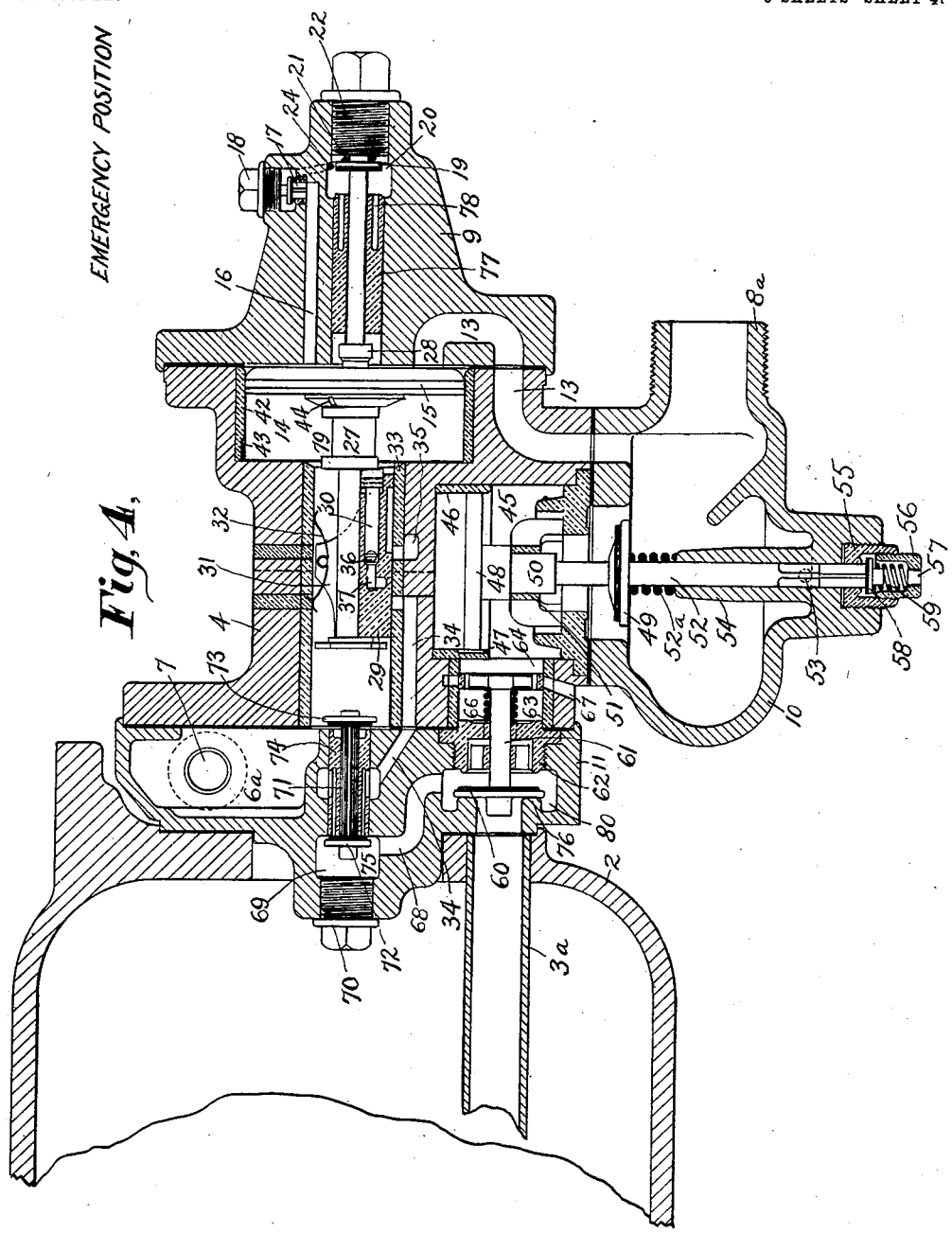
Figure 5:
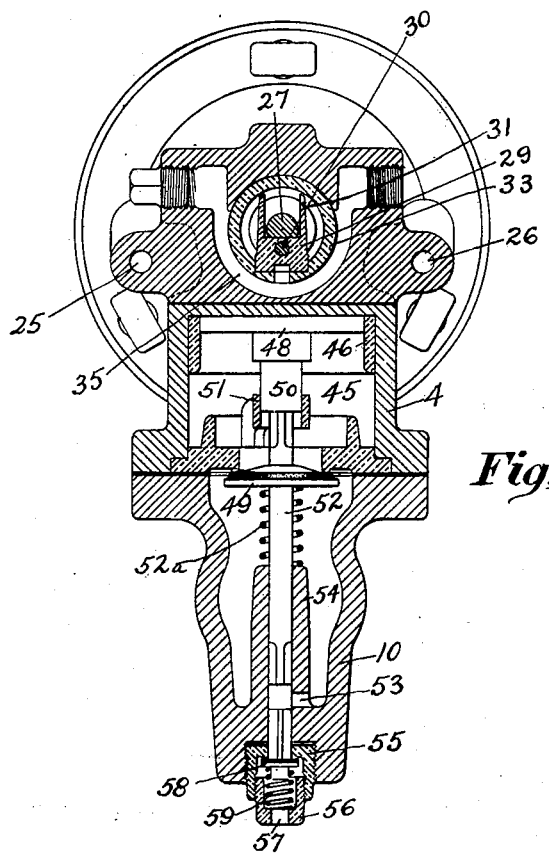
Figure 10:
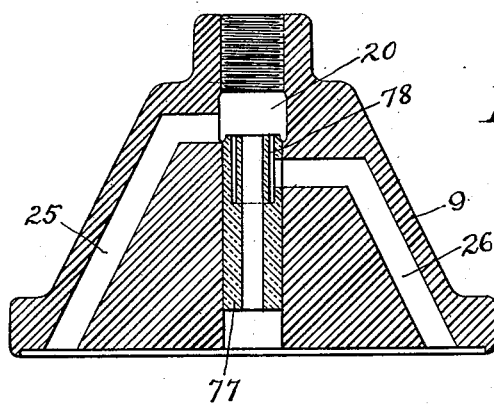
Figure 11:
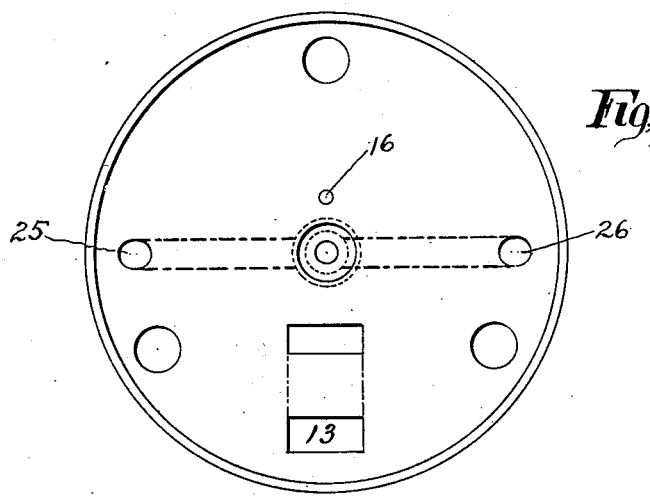
Figure 12:
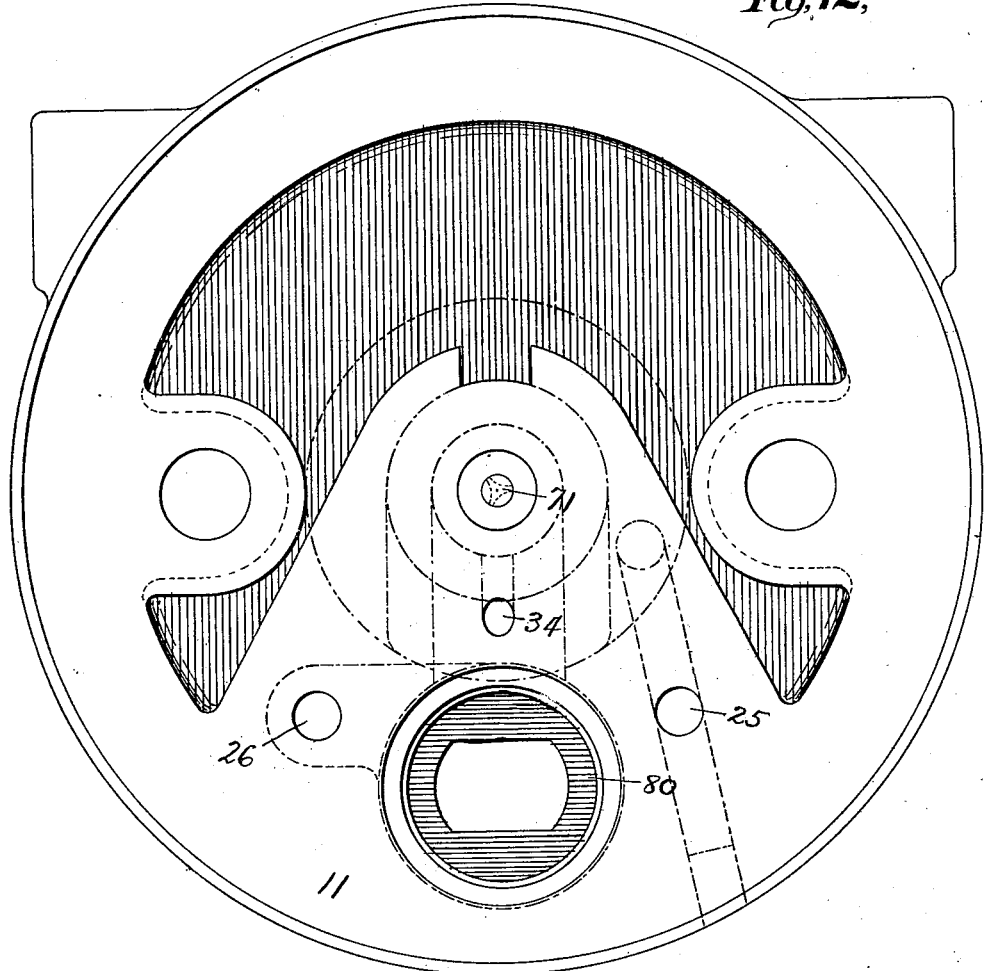
Figure 13:
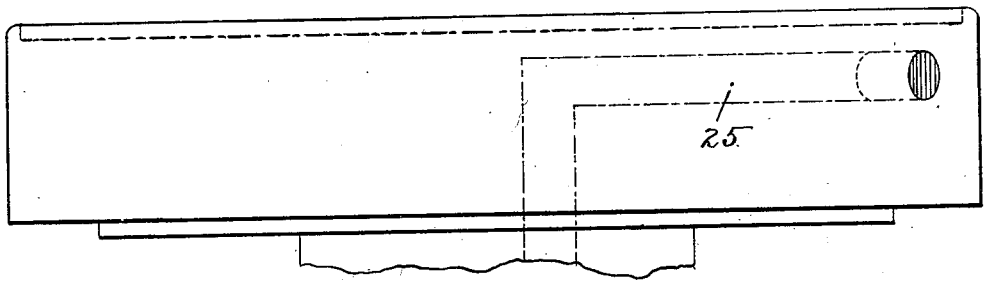
Figure 14:
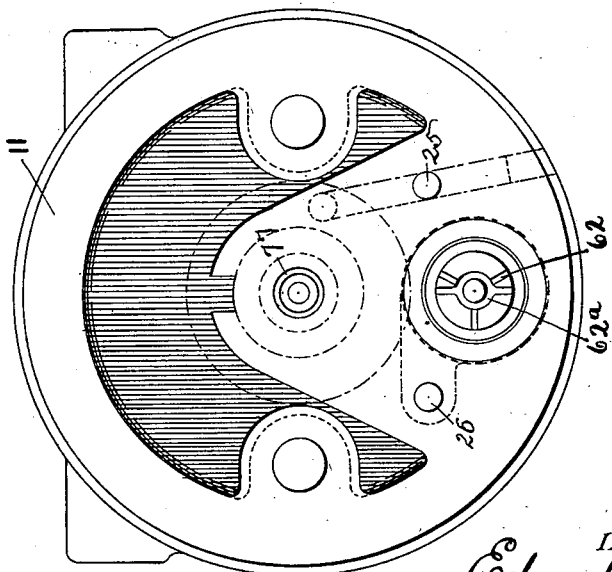

In the annexed drawings, illustrating my invention, Figure 1 is a bottom plan view of a railway-car equipped with my improved air-brake mechanism. Fig. 2 is a central vertical section of the triple-valve device, the operative parts thereof being represented in the release position. Fig. 3 is a similar sectional view showing the parts in the position that may be termed the "graduation" position. Fig. 4 is a similar sectional view showing the coöperatively-movable parts occupying the emergency position. Fig. 5 is a vertical transverse section on the line $x\ x$ of Fig. 2 looking toward the right. Fig. 6 is a somewhat conventional delineation of the slide-valve and its seat for the purpose of representing the proper relative arrangement and location of the ports of both parts at the time of graduation. Fig. 7 is a similar view showing the relative position of these ports at the time of emergency action. Fig. 8 is a similar view showing the relative position of these ports at the time of release. Fig. 9 is a longitudinal vertical section of the slide-valve and the graduation-valve situated therein. Fig. 10 is a central horizontal section of the conical cap that is attached to the right-hand end of the valve-body. Fig. 11 is an elevational view of that face of the same which comes into contact with the valve-body and shows the ports therein. Fig. 12 is an elevational view of the face of the chambered plate that is interposed between the valve-body and the auxiliary reservoir, said face being the one next to the valve-body. Fig. 13 is an edge view of the same plate. Fig. 14 is a view similar to Fig. 12, but showing certain additional parts.

Figure 16:
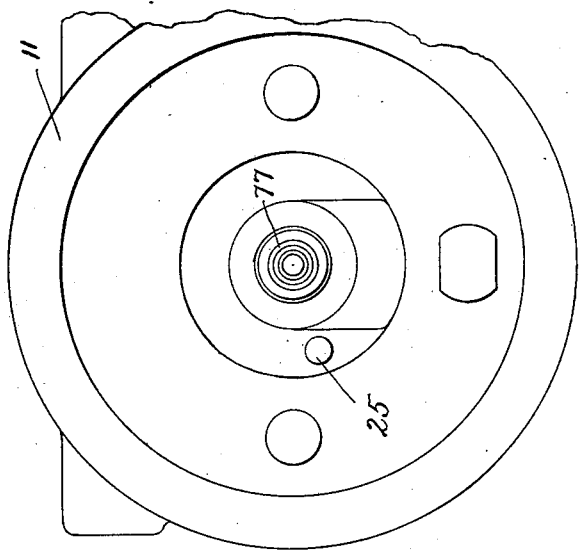
Figure 15:
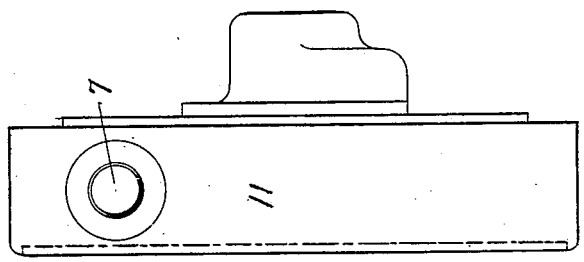

Fig. 15 is an edge view of the same, indicating the opening with which the graduating-reservoir is in communication. Fig. 16 is an opposite face view of this plate. Fig. 17 is a detail sectional view of the secondary emergency-brake-cylinder supply and train-pipe-exhaust valves.

Similar numerals of reference designate corresponding parts throughout all the different figures of the drawings.

Reference to Fig. 1 exhibits 1 denoting the bottom timbers of a railway-car, which latter is offered here simply by way of example, 2 as denoting the auxiliary reservoir, 3 the brake-cylinder, 4 the triple-valve body, 5 the train-pipe, having a lateral branch 8 entering the triple valve, and 6 the graduating-reservoir, consisting in the present example of a bend of pipe having a suitable predetermined capacity, both whose ends are closed, and said reservoir communicating with the triple valve through the branch or connection 7. A portion of the leverage mechanism between the brake-piston and the brake-beams is also displayed in Fig. 1 in conjunction with the before-mentioned parts of the air-brake apparatus; but a detailed explanation thereof is unnecessary here.

Proceeding now to describe the valve mechanism proper and point out the features of the present improvements, it will be observed by looking at Figs. 2, 3, and 4 that the substantial and physical form of the valve comprises, essentially, the body 4, a cap 9 on the right-hand side of the body, a drip-cup 10 on the bottom of the body, and a chambered plate or casting 11, located between the body 4 and the contiguous head of the auxiliary reservoir 2, the whole construction being supported by any suitable attachment to the auxiliary reservoir. In the particular form of reservoir and cylinder depicted herein a pipe 3ª runs from the cylinder through the reservoir and connects with the triple valve, said pipe being to all intents and purposes so far as function is concerned a part of the brake-cylinder and being treated as such in the subsequent description.

The drip-cup 10 is merely a hollow casting situated below the body 4, and although primarily designed to catch any moisture that may fall from the working parts of the valve functions also to provide a train-pipe space 12, into which train-pipe air flows from the train-pipe branch 8, which is coupled to the threaded projection 8ª on cup 10, and, further, the cup 10 furnishes a space wherein the primary emergency train-pipe delivery-valve 49 operates, all as will be fully set forth. Such moisture as may fall into the drip-cup 10 will accumulate in the bottom thereof, from which it will be blown off or expelled through the agency of a valve provided for the purpose. Within the cup 10, rising from the bottom thereof, is an integral hollow vertical stem 54, which receives the lower end of a rod 52, belonging to the primary emergency-valve 49, a spring 52ª being tensioned between the top of stem 54 and the said valve 49, which spring serves to keep the valve 49 normally closed against its seat. The hollow stem 54 serves to guide the rod 52 during the movements of the latter and of valve 49. The central passage of stem 54 communicates with a recess on the bottom of cup 10, that receives a removable valve-casing 55, which in turn admits a screw-plug 56, perforated at 57. Within the casing 55 is a valve 58, held upwardly against its seat by a spring 59, which valve has a wing-stem situated and movable within the hollow stem 54. An orifice 53 allows the drip within cup 10 to pass into the hollow stem 54 and above the valve 58. Whenever the emergency-valve 49 opens and its rod 52 is thrust downwardly in consequence, it will strike forcibly against the stem of valve 58, thereby opening said valve and causing the waste accumulations to be expelled through the eduction-opening 57.

In a suitable chamber 14 of the valve-body 4 is the main piston, diaphragm, or abutment 15, having a rod 27. This piston 15 is adapted to slide within the bushing 42, fitted in the piston-chamber 14, there being a feed-port 43 at the left-hand edge of chamber 14, through which when the periphery of piston 15 is directly opposite it, so as to leave it open, as shown in Fig. 2, the air can flow from the right-hand side of piston 15 to the other side thereof and then through port 44, grooved in a part of the piston near its stem 27 into the interior of the slide-valve casing or seat 33. Piston-chamber 14, or rather that part of the chamber on the right-hand side of the piston 15, constitutes a train-pipe space, and train-pipe air is delivered thereinto through the port 13 from the space 12.

In the cap 9, which may be made of a conveniently conical shape, is a horizontal reservoir-charging port 16, that communicates with and receives air from the piston-chamber 14. At the center of the cap 9 and near the apex of its conical form is an inner cavity 20, closed against the outer atmosphere by a removable screw-plug 22. On the side of the cap 9 is a check-valve-containing recess in which is the check-valve 17, access to which may be had by removing the screw-plug 18. Port 16 runs straight from chamber 14 to the check-valve 17. A short port 24 leads from check-valve 17 to the inner cavity 20. Thus it will be seen that a check-valve is interposed in the length of the reservoir-charging port which effectually prevents any backflow of pressure from the reservoir during the operation of the valve. Within the cavity 20 is what may be termed a "reservoir delivery emergency-valve" 19. This is closed except in emergency action when it is desired to employ reservoir-pressure. By referring to Fig. 10 it will be seen that a port 25 runs from the cavity 20 through cap 9, the ultimate destination of said port being the auxiliary reservoir 2, and it will also be seen that a port 26 runs from the cavity 20 through the cap 9, its final direction being into the brake-cylinder. In Figs. 5, 12, 14, and 16 these two ports 25 and 26 appear, and their course is indicated, for it will be noticed that they lead along opposite sides of the valve-body 4 and enter the chambered plate 11, port 26 finally connecting with the brake-cylinder and port 25 with the auxiliary reservoir. The course of ports 25 and 26 is indicated in so far as the sides of the valve-body are concerned in Fig. 5. In Figs. 10 and 11 their course in the cap is shown. In Figs. 12 and 13 they are shown in the chambered plate, and in Figs. 14 and 16 it is indicated how they pass into the chambered plate and reach the auxiliary reservoir and brake-cylinder. Delivery of air is only had into port 26 from the cavity 20 when the valve 19 is unseated. 77 designates the seat of said valve. It is securely fastened in a central bore of the cap 9 and has itself a central passage containing the stem 23 of the emergency-valve 19. Also the seat-piece 77 has a short annular passage 78, that provides the channel of communication between cavity 20 and port 26 when valve 19 is open. A spring 21 normally holds the valve 19 over the passage 78. Thus it will be perceived that at the time of emergency when valve 19 is removed from its seat the fluid-pressure from the auxiliary reservoir can pass directly and with full effect into the brake-cylinder, and it may be remarked in passing that in emergency action the throw of the piston 15 to the right will cause its central knob 28 to strike forcibly the end of stem 23, and thereby cause an opening of the valve 19, whereas in graduation action the knob 28 will halt as soon as it touches stem 23, the latter serving as a graduation-stop. Ports 25 and 26 are restricted in size, so that in emergency action there may be a chance for the train-pipe air to be delivered to the brake-cylinder through the valve 60, for if port 26 were sufficiently large no train-pipe air could reach the cylinder, and hence it is necessary to restrict the size of the port to delay the movement of the air from the auxiliary reservoir and permit the train-pipe air to reach the cylinder through valve 49 and valve 60 in advance of the reservoir-pressure coming through ports 25 and 26.

The stem 27 of the main piston 15, the slide-valve 29, and the graduation-valve 30 are arranged within an elongated chamber in the valve-body 4, which chamber is inclosed by a horizontal bushing or sleeve 33, which is tubular with the exception of the bottom thereof, wherein is a rectangular groove (see Fig. 5) which forms a seat and guide for the movement of the rectangularly-shaped slide-valve 29. A portion of the stem of piston 15 between the shoulders or flanges 79 79 is semicircular in form and lies between two flanges or ears 31 31 on the slide-valve 29, the length of the latter being slightly less than the distance between these shoulders 79, thereby permitting a limited movement of the piston without moving the slide-valve. The graduating-valve 30 is attached to and moves with the stem 27 of piston 15 and lies within a suitable recess in the slide-valve 29, opening and closing the ports 36 36 in the slide-valve, and thus controlling the admission of air from the interior of the slide-valve chamber into the interior port 37 of the slide-valve, which port 37 opens into the port 38, one of the ports on the bottom face of the slide-valve 29, and the one which functions principally as a graduation-port. A flat spring 32, engaging the side flanges 31 and bearing against the upper side of the slide-valve chamber, causes said valve to tightly hug its seat. The ports on the slide-valve and the coöperating ones in its seat must now be briefly described, and in order to more intelligently present their relation at different times I have placed upon the drawings the conventional representations in Figs. 6, 7, and 8, in which the rectangular or grooved seat 33 is shown and therewith a thin section of the slide-valve 29, the said section being so cut that the slide-valve ports may appear as they actually do on the bottom or sliding face of said valve. On the bottom of the slide-valve, therefore, there are three ports—the graduation-port 38, already mentioned, a lateral emergency-port 39, which is simply a rectangular or other shaped notch in one edge of valve 29 in constant and open communication with the interior of the slide-valve chamber and designed at emergency to allow the contents of said chamber, as well as the contents of the connecting-reservoir 6, to pass out through an emergency-port 41, connecting the slide-valve chamber with the chamber 45 to operate the piston 48, and the long, crooked, and shallow port 40, serving principally as a release-port and designed to connect the ports 34 and 35, leading, respectively, from the brake-cylinder and to the atmosphere. In the seat 33 are three of the ports just mentioned—one, 35, leading to the atmosphere, (see Fig. 5,) a second, 34, leading to the brake-cylinder, and a third, 41, leading to the emergency-piston. In explaining the operation of my valve I will discuss more minutely the coincidental relations of these ports.

The graduating-reservoir 6 is a receptacle for containing a quantity of air supplied thereto from the train-pipe in a manner I shall presently describe and is entirely separate and distinct from and independent of the auxiliary reservoir. This graduating-reservoir is coupled to the triple valve at some convenient point. In the present example of my invention the graduating-reservoir pipe 7 enters the chambered plate 11, so as to make communication with the chamber 6ª, which may properly be termed a "graduating-reservoir" space. Chamber 6ª is in constant communication with the slide-valve chamber, as is seen by reference to Figs. 2, 3, and 4. I deem the graduating-reservoir to be one of the most important features of the present invention, since by its use a quantity of air is taken from the train-pipe to be employed during the service applications of the brakes, thus permitting the auxiliary reservoir to be reserved intact for use at emergency. The size and shape of this reservoir may vary within wide limits, for obviously it may be constructed in the form of a cylinder or tank or of a bend or coil of piping or in any other style found most convenient, serviceable, and economical.

At the center of the circular plate or casting 11 and in rectilinear alinement with the slide-valve and main piston-stem is a valve device which I term a "secondary" graduation and release valve, for it controls the flow of air from the slide-valve to the brake-cylinder in graduation action, as well as the return flow at the time of release after emergency, a portion of which return flow is conducted into the graduation-reservoir, and thereby saved. Said valve device consists of two valves 72 and 73, carried on the opposite ends of a triangularly-shaped stem 71, which lies within a tubular central passage of the seat-piece 74, which seat is supported in a part of the casting 11, so that it may be between the slide-valve chamber and the chamber 69, which latter chamber is, in fact, a casing for the valve 72, access to said chamber being had by removing the screw-plug 70. The seat 74 has an annular port 75 extending from the graduating-port 34, (which, we have seen before, runs from the slide-valve seat 33) to the aforesaid chamber 69, and the valve 72 is designed to close or open this port 75. The valve 73 belonging to the valve device which I am now describing is situated at the left-hand end of the slide-valve chamber. When the valve 72 is closed, the valve 73 will be unseated, as is the case in emergency action, and when valve 73 is closed valve 72 will be unseated, as is the case in graduation action, or both valves may be slightly open at the same time, as is the case after emergency, when the parts occupy the full-release position, the reason and cause for which open condition of both valves will be set forth in detail hereinafter.

In the casting 11, adjacent to the brake-cylinder pipe 3ª, is a brake-cylinder chamber 80, which also may be esteemed a valve-chamber, as it contains the secondary emergency train-pipe delivery-valve 60. Chamber 80, it will also be noted, is entered by the port 26, through which air is conducted from the auxiliary reservoir to the brake-cylinder. A port 68 extends from chamber 69 to chamber 80. Thus it will be seen that the valve 72 connects the graduation-port 34 and brake-cylinder port 68 at the time of graduation, while at the time of release after emergency there is not only this same connection, although the size of the opening between the valve and its seat is smaller; but since both valves 72 and 73 (see Fig. 2) are now unseated release-pressure will flow through the passage containing the triangular valve-stem 71 and be transferred through the graduation-reservoir space 6ª to the graduation-reservoir 6.

The emergency-valve 60 has a stem 61, supported and movable in a bearing 62. This bearing is of a skeleton form, as clearly shown in Fig. 14, having arms radiating from the center to the outer shell, so that air can easily flow through it, and I also find it convenient to provide a second bearing 62ª of a similar skeleton form and arranged within or made integral with the shell or sleeve portion of bearing 62. (See again Fig. 14, as also Figs. 2 and 17.) On the opposite end of stem 61 is a ring-valve 64, consisting of a skeleton wheel. Valve 64 is designed to reciprocate within a bushing 63, having a circular series of perforations 65, located in the same vertical plane and communicating with an opening 67, which leads to the atmosphere. A spring 66, tensioned between the bearing 62 and the hub of the ring-valve 64, acts to draw the valve 60 normally to its seat. When valve 60 is closed, as shown in Figs. 2 and 3, then the exhaust-outlet 67 to the atmosphere will be open. When valve 60 has been opened, as shown in Fig. 4, in consequence of having been forced against the stop projections 76, (said forcing of the valve open being accomplished by the passage of the train-pipe air through valve 49 when it is opened,) the exhaust-opening 67 will be closed by the valve 64, which will be over and will shut the orifices 65. Valve 60 has the function of delivering train-pipe air to the brake-cylinder during emergency action, and therefore may properly be termed a "secondary" emergency train-pipe delivery-valve for the brake-cylinder. The valve 64, however, enables the train-pipe air to be discharged to the atmosphere whenever necessary at the time of emergency application. When the valve 60 is wide open and train-pipe air is being employed in the brake-cylinder, the discharge-vent 67 to atmosphere will be closed, so that the train-pipe air has no exit at that point; but when the valve 60 closes, as it does when the pressure of the train-pipe air against it has diminished in consequence of the outflow of train-pipe air to the brake-cylinder and the increase of pressure on the brake-cylinder side of valve 60 over what it is on the train-pipe side thereof, the channel to the atmosphere is opened and the surplus of train-air that has passed the primary emergency-valve is gotten rid of in that way. Here then is an automatic utilization of such train-pipe air as may be needed, in conjunction with auxiliary-reservoir air, to effect emergency action, coupled with an automatic discharge of the rest of the train-pipe air to the atmosphere.

48 denotes the emergency-piston. It is provided with a rod 50, which carries the primary emergency-valve 49, of which I have already briefly spoken, said emergency-valve having the downwardly-projecting rod 52.

The piston 48 works within a chamber 45, in the upper part of which is a bushing 46, having at one side an escape-port 47, through which during the piston's descent the air-pressure from the graduation-reservoir that depresses the piston 48 at emergency may escape after the piston has been driven down, and through this port the graduation-reservoir pressure will escape to the atmosphere exhaust-port 67 after doing its duty on the piston.

I will now describe how my air-brake system is charged and how it operates in fulfilling its various functions in service and emergency applications of the brakes and at the time of release.

Suppose now that the apparatus is empty and a charging of the same with air is to be effected. Air from the main reservoir on the engine being discharged into the train-pipe by the engineer's brake-valve enters the triple valve through the nozzle $8^a$ and passes thence into the train-pipe space 12 and through port 13 to the piston-chamber 14, compelling the piston 15 to occupy the position shown in Fig. 2, which is the position it takes when the brakes are released, in which position the feed-port 43 is uncovered, so that air is permitted to pass by the piston, thence through the port 44 to the chamber occupied by the slide-valve, from which it flows freely into the graduating-reservoir space $6^a$ and out of this through the pipe 7 to the graduating-reservoir 6, charging the latter to the same pressure as that in the train-pipe. At the same time train-pipe pressure will flow through the reservoir-charging port 16, past the check-valve 17, and thence through port 24, chamber 20, and port 25 into the auxiliary reservoir 2. Hence at this time it will be understood that the train-pipe, the auxiliary reservoir, the graduation-reservoir, and certain interior spaces of the triple valve, as specified, will be filled with air at train-pipe pressure. At this time valve 73 will be closed upon its seat on account of the pressure against it within the slide-valve chamber, while the valve 72 will be open, although its open condition will not in the preliminary charging be of any consequence, although at release, of course, it provides an outlet for the exhaust. The primary emergency-valve 49 is now closed, so that train-pipe air cannot have exit to the atmosphere or to the brake-cylinder. The secondary emergency-valve 60 is closed, and the brake-cylinder emergency-valve 19 for auxiliary-reservoir air is likewise closed. The position of slide-valve 29 relatively to its seat 33 is such that the release-port 40 connects graduation-port 34 and exhaust-port 35, and the position of the graduation-valve 30 is such that the lateral ports 36 36 are closed and no air can pass from the slide-valve chamber into the interior of the slide-valve. Obviously the emergency-port 39 and the graduation-port 38 are idle and inactive at this time.

I will now explain what occurs when we pass from the release or running position—i. e., from a position wherein the parts are relatively arranged in the manner just set forth—to graduation position, and in so doing it will be necessary to specify in detail the manner of making a service application of the brakes. The engineer's valve will be manipulated in the proper way to make the desired reduction in the train-pipe. As there will likewise be a simultaneous reduction of pressure in the ports and spaces directly in communication with the train-pipe, a reduction of pressure will take place in the piston-chamber 14 on the right-hand side of the piston 15, and accordingly the graduation-reservoir air on the opposite side of said piston will have an opportunity to expand, and such expansion will urge the piston 15 toward the right until its central knob or projection 28 contacts with the end of the stem 23, which stem will serve now as a graduation-stop, functioning to accurately define the position of the main piston 15 upon the occasion of graduation action. (See Fig. 3.) The movement of the piston 15 carries with it the slide-valve 29 and the graduation-valve 30. The graduation-valve 30 being loosely connected by means of a pin or otherwise to the rod 27, starts to move before the slide-valve, since the latter does not begin to slide until caught against the terminal shoulder 79, and this preliminary impulse of the graduation-valve is sufficient to uncover the lateral ports 36 36 in the slide-valve and allow the pressure within the slide-valve chamber, which, we have seen, is graduation-reservoir pressure, to enter into the interior space 37 of the slide-valve and thence into the graduation-port 38. Moreover, this movement of the slide-valve 29 has disconnected the release-port 40 from the seat graduation-port 34 and has brought the slide-valve graduation-port 38 into coincidence with the seat graduation-port 34. (See Fig. 6.) Hence air will flow through the graduation and slide valves from the graduation-reservoir into the port 34, then through the valve 72, the brake-cylinder port 68, the brake-cylinder space 80, and on into the brake-cylinder. It will be clearly understood that in passing from running position to graduation position air will be used solely from the graduation-reservoir and none out of the auxiliary reservoir and none out of the train-pipe. The same will be true of the process pursued in passing from one position of graduation reduction to another position of graduation reduction. I reserve the auxiliary reservoir entirely untouched for use in emergency action, and I achieve all the graduation reductions by drawing upon the air which is kept in the "graduation-reservoir," so called, air being intermittently supplied thereto from the train-pipe when the parts are in such location as to allow a feed to take place.

Having thus spoken of the method of primarily charging the system and also of the operation of the valve in graduation action, I will now describe in detail what takes place in making an emergency reduction. When a case arises demanding instant remedy, a large and quick reduction of pressure will be caused to take place in the train-pipe, and the consequence thereof to the piston 15 will be that it will not stop when its central knob touches the stem 23, as it does in graduation, but the impact against the stem will be so hurried and violent as to retrude the stem, and thereby move the emergency-valve 19 from its seat and open the auxiliary-reservoir port 25, so as to bring it into communication with the brake-cylinder port 26 and allow reservoir-pressure to be delivered against the brake-piston. Simultaneously with the collision of the piston or abutment and the emergency-valve stem or, perhaps, slightly before the opening of said valve, although the difference in time is inappreciable, the piston or abutment by its reciprocation and consequent movement of the slide-valve 29 brings the ports of said slide-valve into that relation to the ports in the seat 33 shown in Fig. 7. (See Fig. 4 also.) Emergency-port 39 on the side of slide-valve 29 is now in conjunction with the vertical port 41, that leads directly down from the slide-valve chamber to the emergency-piston 48. No other ports in the slide-valve and its seat are in register at this time save only these two. Through them the graduation-reservoir pressure passes downward and drives the piston 48 to chamber 45, the stem 50 of said piston, which carries the primary emergency-valve 49, throwing the said valve from its seat and allowing train-pipe air to rush through the opening thus provided. If at this time there is no pressure in the brake-cylinder or if such pressure is not over fifteen or twenty pounds or, in fact, if it is anything less than the ingoing train-pipe pressure, the latter will open valve 60, at the same time closing exhaust-valve 64, and said train-pipe pressure will flow, together with the auxiliary-reservoir pressure already spoken of, into the brake-cylinder. Several things are to be observed at this time. After the piston 48 has dropped low enough to bring its periphery opposite to the lateral escape-port 47 the graduation-reservoir pressure will escape through said port, the graduation-reservoir being emptied in this way until the pressure above the piston 48 falls below the tension of spring 52ª, when the valve 49 will close and the piston 48 be restored to its normal position, while at the same time the confined graduation-reservoir and train-pipe air will find outlet to the atmosphere as soon as exhaust-valve 64 opens the egress-port 67. The pressure of auxiliary-reservoir air in the chamber 80, port 68, and chamber 69 will close valve 72 tightly upon its seat. As soon as the pressure in the brake-cylinder equalizes with the inrushing train-pipe pressure the valve 60 will close, whereat the exhaust-valve 64 will open and such train-pipe air as has passed valve 49 will be disposed of by venting to the atmosphere.

I will next detail the action of the parts in releasing after emergency action. For this purpose pressure will be restored in the train-pipe in the customary way. This will cause the parts to assume the position shown in Fig. 2, which is that of full release and is the same as I have already referred to in discussing the initial charging of the system. As the piston 15 returns to its position in the left-hand end of piston-chamber 14 its rod 27 will strike the valve 73 and move it slightly toward its seat, but not enough to close it, although the contact will be sufficient to slide the connecting-stem 71 and open valve 72. This will cause a passage to be opened from the brake-cylinder to the graduation-reservoir through port 68, along the sides of the triangular valve-rod 71, through valve 73, and into slide-valve chamber and graduation-reservoir space 6ª. Hence a large amount of the fluid used in braking will be saved by being transferred back into the reservoir. Of course at this same time the air released from the cylinder is coursing past the valve 72 into the annular port 75, thence into port 34, through slide-valve port 41 and seat-port 35, which latter permits efflux to the atmosphere, as shown in Fig. 5.

Numerous changes in the precise construction and combination of the parts may be made without departing from the invention, and I reserve the liberty of so varying the same as may be necessary.

Having thus described my invention, what I claim as new, and desire to secure by Letters Patent, is—

1. In a fluid-pressure brake mechanism, the combination with the train-pipe, brake-cylinder, and auxiliary reservoir, of a graduation-reservoir containing a volume of air at train-pipe pressure, its supply being afforded by an intermittent feed from the train-pipe and also from the brake-cylinder during release after emergency action, means for conducting the graduation-reservoir air exclusively to the brake-cylinder in service applications of the brakes, and means for conducting the auxiliary-reservoir pressure and train-pipe pressure to the brake-cylinder in emergency applications, said auxiliary-reservoir pressure being retained unused except in emergency action.

2. In a fluid-pressure brake mechanism, the combination with the train-pipe, brake-cylinder, and auxiliary reservoir, of a graduation-reservoir containing a volume of air at train-pipe pressure, its supply being afforded by an intermittent feed from the train-pipe and also from the brake-cylinder during release after emergency action, means for conducting pressure from this reservoir exclusively to the brake-cylinder in service applications of the brakes, and means for conducting auxiliary-reservoir pressure to the brake-cylinder in emergency applications of the brakes, said auxiliary-reservoir pressure being reserved intact for emergency uses only.

3. In a fluid-pressure brake mechanism, the combination with the train-pipe, brake-cylinder, and auxiliary reservoir, of a graduation-reservoir containing a volume of air at train-pipe pressure, its supply being afforded by an intermittent feed from the train-pipe and also from the brake-cylinder during release after emergency action, a valve mechanism for conducting the graduation-reservoir air exclusively to the brake-cylinder in service applications of the brakes, and a valve mechanism for conducting the auxiliary-reservoir pressure and the train-pipe pressure to the brake-cylinder in emergency applications, said auxiliary-reservoir pressure being retained unused except in emergency actions only.

4. In a fluid-pressure brake mechanism, the combination with the train-pipe, brake-cylinder, and auxiliary reservoir, of a graduation-reservoir containing a volume of air at train-pipe pressure, said reservoir having the function of performing service applications of the brakes and of opening the train-pipe air-delivery passage to brake-cylinder and atmosphere at the time of emergency, and means for conducting the auxiliary-reservoir pressure to brake-cylinder in emergency actions, said auxiliary-reservoir pressure being retained unused except in emergency applications.

5. In a fluid-pressure brake mechanism, the combination with the train-pipe, brake-cylinder, and auxiliary reservoir, of a graduation-reservoir containing a volume of air at train-pipe pressure, means for conducting the graduation-reservoir air exclusively to the brake-cylinder in service applications of the brakes, and means for transferring a portion of the braking fluid to the graduation-reservoir during release after an emergency application of the brakes.

6. In a fluid-pressure brake mechanism, the combination with the train-pipe, brake-cylinder, and auxiliary reservoir, of a graduation-reservoir containing a volume of air at train-pipe pressure, means for conducting the graduation-reservoir air exclusively to the brake-cylinder in service applications of the brakes, means for conducting the auxiliary-reservoir pressure and train-pipe pressure to the brake-cylinder in emergency applications, said auxiliary-reservoir pressure being retained unused except in emergency action, and means for conducting a portion of the braking pressure from the cylinder to the graduation-reservoir during release after emergency action.

7. In a fluid-pressure brake mechanism, the combination with the train-pipe, auxiliary reservoir, brake-cylinder, and graduating-reservoir, the latter containing a volume of air at train-pipe pressure, of valve devices for controlling the flow of air from the graduation-reservoir to the brake-cylinder in service applications, and of auxiliary-reservoir air to the cylinder in emergency applications only, and of train-pipe air to the brake-cylinder in emergency applications, and valve mechanism for transferring a portion of the braking fluid from the brake-cylinder to the graduation-reservoir during release after emergency action.

8. In a fluid-pressure brake mechanism, the combination with means for conducting pressure from a special reservoir filled with air at train-pipe pressure to the brake-cylinder in service applications only, and for conducting auxiliary-reservoir air and train-pipe air to the brake-cylinder at emergency times, said auxiliary-reservoir pressure being retained intact except when used in emergency action, and means for saving a portion of the braking fluid from the brake-cylinder after emergency action.

9. In a fluid-pressure brake mechanism, in combination with valve devices for controlling the flow of air from the graduation-reservoir, which is wholly independent of the auxiliary reservoir, to the brake-cylinder in service applications of the brakes, and for controlling the flow of auxiliary-reservoir air to the cylinder in emergency applications only, a piston or abutment operating said valve devices, said abutment being exposed on one side to train-pipe pressure and on the opposite side to graduation-reservoir pressure, and emergency valve devices for controlling the flow of train-pipe air in emergency, said devices comprising a piston acted upon by graduation-reservoir pressure, a train-pipe delivery-valve operated by the piston, and a double valve controlling a passage into the brake-cylinder and an atmosphere exhaust-port.

10. In a fluid-pressure brake mechanism, the combination with the train-pipe, brake-cylinder, and auxiliary reservoir, of a graduation-reservoir containing a volume of air at train-pipe pressure, means for conducting the graduation-reservoir air exclusively to the brake-cylinder in service applications of the brakes, and means for transferring braking fluid to the graduation-reservoir during release after emergency, said means consisting of a valve device that permits air to flow from brake-cylinder to graduation-reservoir at the same time that it permits a flow to atmosphere.

11. In a fluid-pressure brake mechanism, the combination with the train-pipe, auxiliary reservoir, and brake-cylinder, of a graduating-reservoir containing a volume of air at train-pipe pressure, valve mechanism for transferring graduating-reservoir pressure to the brake-cylinder only in service applications of the brakes, a piston or abutment for operating said valve devices, an emergency-valve for delivering auxiliary-reservoir air to the brake-cylinder in emergency actions, said auxiliary-reservoir pressure being reserved intact except at emergency, and said valve being operated by the aforesaid abutment, and emergency valve devices for delivering train-pipe air to the brake-cylinder and atmosphere in emergency actions, consisting of a piston impelled by graduation-reservoir pressure, a train-pipe delivery-valve actuated by said piston, and two valves moving in unison with each other, one controlling a passage into the brake-cylinder and the other controlling an exhaust-port to the atmosphere, said two valves being arranged so that when one is open the other is closed.

12. In a fluid-pressure brake mechanism, in combination with the essential elements of a brake system, a reservoir containing air at train-pipe pressure and employing the same exclusively in all service applications of the brakes, and valve mechanism for supplying train-pipe air to the brake-cylinder at emergency to act in conjunction with the auxiliary-reservoir air supplied at the same time, the impulse for actuating said valve mechanism being received from the service-reservoir pressure, and said valve mechanism consisting of two valves on a common stem, one controlling a passage into the brake-cylinder and the other controlling an exhaust-port to the atmosphere, which two valves are arranged so that when one is open the other is closed.

13. In a fluid-pressure brake mechanism, in combination with the essential elements of a brake system, a reservoir containing air at train-pipe pressure, its supply being afforded by an intermittent feed from the train-pipe and also from the brake-cylinder during release after emergency action, said reservoir being employed in effecting all service applications.

14. In a fluid-pressure brake mechanism, the combination with the train-pipe, auxiliary reservoir, and brake-cylinder, of a graduation-reservoir, containing a volume of air at train-pipe pressure, its supply being afforded by an intermittent feed from the train-pipe and also from the brake-cylinder during release after emergency action, valve mechanism for transferring graduation-reservoir pressure to the brake-cylinder only in service applications to the brakes, an emergency-valve for delivering auxiliary-reservoir air to the brake-cylinder in emergency action, said auxiliary-reservoir pressure being reserved intact except at emergency, a valve for allowing the air to pass out of the train-pipe at emergency, said valve being impelled by the action of graduation-reservoir air, and a double-valve device for delivering this train-pipe air to the brake-cylinder or the atmosphere, consisting of two valves moving in unison, one controlling a passage into the brake-cylinder and the other controlling an exhaust-port to the atmosphere, one of these two valves being closed while the other is open.

15. In a fluid-pressure brake mechanism, the combination with the essential elements of a brake system including a brake-cylinder, of a graduation-reservoir containing a volume of air at train-pipe pressure, its supply being afforded by an intermittent feed from the train-pipe and also from the brake-cylinder during release after emergency action, said reservoir being employed in effecting all service applications, while the auxiliary-reservoir air is reserved intact for use in emergency actions only, and means for using the train-pipe air at emergency in the brake-cylinder or venting it to the atmosphere, consisting of two valves on a common stem, one controlling a passage into the brake-cylinder and the other controlling an exhaust to the atmosphere, one being open while the other is closed.

16. In a fluid-pressure brake mechanism, the combination with the essential parts of a brake system, of a graduation-reservoir whose primary purpose is to effect service applications, an emergency-piston impelled at emergency by the graduation-reservoir pressure, a train-pipe delivery-valve actuated by said piston, and a valve device controlling a passage into the brake-cylinder and also an outlet-port to the atmosphere, one being open while the other is closed, which valve device allows the passage of train-pipe air at times of emergency into the brake-cylinder or to the atmosphere.

17. In a fluid-pressure brake mechanism, in combination with the essential elements of a brake system including a brake-cylinder, a reservoir in communication with said brake-cylinder, and means for transferring a portion of the fluid from the brake-cylinder to the reservoir during release after emergency application of the brakes.

18. In a fluid-pressure brake mechanism, in combination with the essential elements of a brake system including a brake-cylinder, a reservoir in communication with said cylinder, and means for transferring a portion of the fluid from the brake-cylinder to the reservoir during release after emergency application of the brakes, said means consisting of two valves on a common stem which are adapted to be simultaneously unseated to allow a flow to the said reservoir at the same time with the exhaust to the atmosphere.

19. In a fluid-pressure brake mechanism, in combination with the essential elements of a brake system including a brake-cylinder, a reservoir in communication with said brake-cylinder, and means for transferring a portion of the fluid from the brake-cylinder to the reservoir during release after an emergency application of the brakes, said means consisting of two valves on a common angular stem which are adapted to be simultaneously unseated to allow a flow to the said reservoir at the same time with the exhaust to the atmosphere, and a seat-piece containing a passage within which the angular stem is situated and through which the fluid can pass to the reservoir, said seat-piece also containing an exhaust-port.

20. In a fluid-pressure brake mechanism, the combination with the train-pipe, brake-cylinder, and auxiliary reservoir, of a graduation-reservoir containing a volume of air at train-pipe pressure, means for conducting the graduation-reservoir air exclusively to the brake-cylinder in service applications of the brakes, and means for transferring a portion of the braking fluid to the graduation-reservoir during release after an emergency application of the brakes, said means consisting of two valves on a common stem adapted to be simultaneously unseated to allow a flow to the graduation-reservoir at the same time with the exhaust to the atmosphere.

In testimony whereof I affix my signature in presence of two witnesses.

EDWARD G. SHORTT.

Witnesses:
M. S. WILDER,
C. P. RYTHER.